United States Patent
French et al.

(10) Patent No.: US 7,128,767 B2
(45) Date of Patent: Oct. 31, 2006

(54) METHOD TO UPGRADE LOW RANK COAL STOCKS

(75) Inventors: Robert R French, Wellington, CO (US); Robert A. Reeves, Arvada, CO (US)

(73) Assignee: GTL Energy, Wellington, CO (US)

( * ) Notice: Subject to any disclaimer, the term of this patent is extended or adjusted under 35 U.S.C. 154(b) by 0 days.

(21) Appl. No.: 10/884,393

(22) Filed: Jul. 1, 2004

(65) Prior Publication Data

US 2005/0039386 A1 Feb. 24, 2005

Related U.S. Application Data

(60) Provisional application No. 60/484,564, filed on Jul. 1, 2003.

(51) Int. Cl.
*C10L 9/00* (2006.01)
*C10L 9/02* (2006.01)

(52) U.S. Cl. .................. 44/620; 44/280; 44/281; 44/282; 48/202

(58) Field of Classification Search .............. 44/620, 44/280, 281, 282; 48/202
See application file for complete search history.

(56) References Cited

U.S. PATENT DOCUMENTS

| | | | |
|---|---|---|---|
| 3,996,026 A | 12/1976 | Cole | 48/197 |
| 4,214,875 A | 7/1980 | Kromrey | 44/6 |
| 4,331,445 A | 5/1982 | Burns | 44/6 |
| 4,331,446 A | 5/1982 | Draper et al. | 44/24 |
| 4,389,218 A | 6/1983 | Pike | 44/6 |
| 4,417,902 A | 11/1983 | Yaghmaie et al. | 44/51 |
| 4,670,058 A | 6/1987 | Mark | 106/283 |
| 4,783,198 A | 11/1988 | Hueschen | 44/51 |
| 4,904,277 A | 2/1990 | Najjar et al. | 44/51 |
| 5,033,230 A | 7/1991 | Kennepohl et al. | 44/502 |
| 5,071,447 A | 12/1991 | Koppelman | 44/621 |
| 5,324,336 A | 6/1994 | Child | 44/608 |
| 5,815,946 A | 10/1998 | Dean | 34/340 |
| 6,068,760 A | 5/2000 | Benham et al. | 208/950 |
| 6,313,361 B1 | 11/2001 | Waycuilis | 585/314 |
| 6,533,945 B1 * | 3/2003 | Shah | 210/765 |
| 6,664,302 B1 | 12/2003 | French et al. | 518/700 |

* cited by examiner

*Primary Examiner*—Cephia D. Toomer
(74) *Attorney, Agent, or Firm*—Sheridan Ross, P.C.

(57) ABSTRACT

The ash content of raw coals, lignite, and other carbonaceous materials is reduced by leaching the high-ash material with an aqueous acidic waste product produced by a Fischer-Tropsch reaction. The acidic aqueous waste is mixed with coal and process conditions are described. The claim takes advantage of using otherwise uneconomic coal, lignite or other carbonaceous material by upgrading the material to a suitable feedstock for combustion in a power plant or gasifier.

21 Claims, 1 Drawing Sheet

METHOD TO UPGRADE LOW RANK COAL STOCKS

CROSS REACTION TO RELATED APPLICATION

This application claims priority to U.S. Provisional Patent Application Ser. No. 60/484,564, filed Jul. 1, 2003, incorporated here, in its entirety, by this reference.

FIELD OF THE INVENTION

The invention provides methods of treating coal with a liquid waste product to up-grade the quality of the coal.

BACKGROUND OF THE INVENTION

Because the United States has become increasingly dependent on foreign sources of natural gas and petroleum, recent focus has shifted to the abundant domestic sources of coal to replace a portion of the foreign sources of natural gas and petroleum. Switching from foreign energy sources to domestic coal will lead to price stability and increased national security.

Coal remains an important source of fuel for electricity generation and a feedstock for coke making and chemical production. Coal is preferred to natural gas and petroleum because of its secure domestic supply and relatively low, stable price. However, using coal requires more extensive processing than natural gas and petroleum to mitigate dust and gas emissions and other environmental concerns. Many investigations have been undertaken to mitigate dust, nitrous oxide, and sulfur dioxide emissions from coal-fired power plants and other sources that use coal. Additionally, other pollutants such as mercury have recently come under scrutiny by governments and health organizations. As a result, future regulations may force coal users to significantly reduce mercury and other heavy metal emissions at great cost.

Coal gasification offers favorable environmental benefits and high energy conversion efficiencies relative to traditional combustion methods used by pulverized, coal-fired power plants. Gasification occurs when coal is placed in a vessel under high temperature and pressure and mixed with steam and oxygen. The organic materials contained in coal are converted into carbon monoxide, carbon dioxide, hydrogen, and other compounds. The combustible components carbon monoxide and hydrogen are typically separated from non-combustible water vapor, carbon dioxide and other gases. The mixture of combustibles, often referred to as synthesis gas or "syngas," provides a feedstock for combustion turbines and gas-to-liquid processes such as the Fischer-Tropsch process. The Fischer-Tropsch process converts syngas into valuable salable organic chemicals such as distillate fuels, naphtha, and wax. Combustion turbines are typically arranged in a combined-cycle configuration to produce more electricity from a given amount of syngas.

The efficiency of gasification, and subsequent gas-to-liquid reactions in a Fischer-Tropsch process, largely depends upon the quality and specific energy content of the coal feedstock. High-quality feedstocks provide better conversion efficiencies than low quality materials resulting in reduced carbon dioxide emissions from high-quality feedstocks.

Countries with few natural gas or petroleum reserves, such as Germany and South Africa, rely on coal and the Fischer-Tropsch process to produce liquid fuels. Low quality coal reserves, especially those found in abundance in the western United States in abandoned coal waste piles in Appalachia, and in many other areas in the world, could be economically useful if a practical method were available to enhance the quality of the coal. Upgrading low-rank coals and lignite by reducing the amount of sodium present would greatly improve the utilization value of the fuel. A significant amount of sodium in the coal is associated with basic compounds that dissolve in acids and other chemicals. Unfortunately, the high cost of these acids and other reagents make the upgrading process economically unattractive to both coal producers and users. The cost of the feedstock (coal, natural gas or petroleum) constitutes the majority of the overall cost of gasification and conversion. The cost of coals increases with the quality and therefore an inexpensive process that would upgrade coal, particularly poor-quality coal, prior to gasification is needed to enhance the overall economics of gasification and conversion. In particular, the process would be beneficial if it reduced ash minerals such as those containing sodium, potassium, calcium and magnesium, elements that often create difficulty with gasification and combustion, to levels that make the use of low rank coals economically feasible.

SUMMARY OF THE INVENTION

The present invention utilizes an inexpensive source of aqueous acidic reagent to upgrade coal for certain gasification applications. Coal gasification plants produce a syngas consisting principally of carbon monoxide and hydrogen. When fed to a Fischer-Tropsch (FT) reactor, this syngas produces both salable liquid products and an acidic waste water. Operators of FT plants must incur costs to dispose of this waste water which consists of acetic acid, alcohols, and other light molecular weight organic compounds. This material, because of its acidic nature, is a potent leaching reagent for removing ash from coal feedstock. Thus, the methods of the present invention treat coal with an aqueous waste product, namely an aqueous acidic waste liquor produced by the Fischer-Tropsch process. The treatment includes contacting coal with FT waste water to remove ash, thereby upgrading the quality of the coal. The mixture of coal and FT waste water is preferably agitated in a vessel for sufficient time to dissolve materials contained in the coal including sodium, potassium, calcium and magnesium.

DETAILED DESCRIPTION OF THE INVENTION

Figure 1:
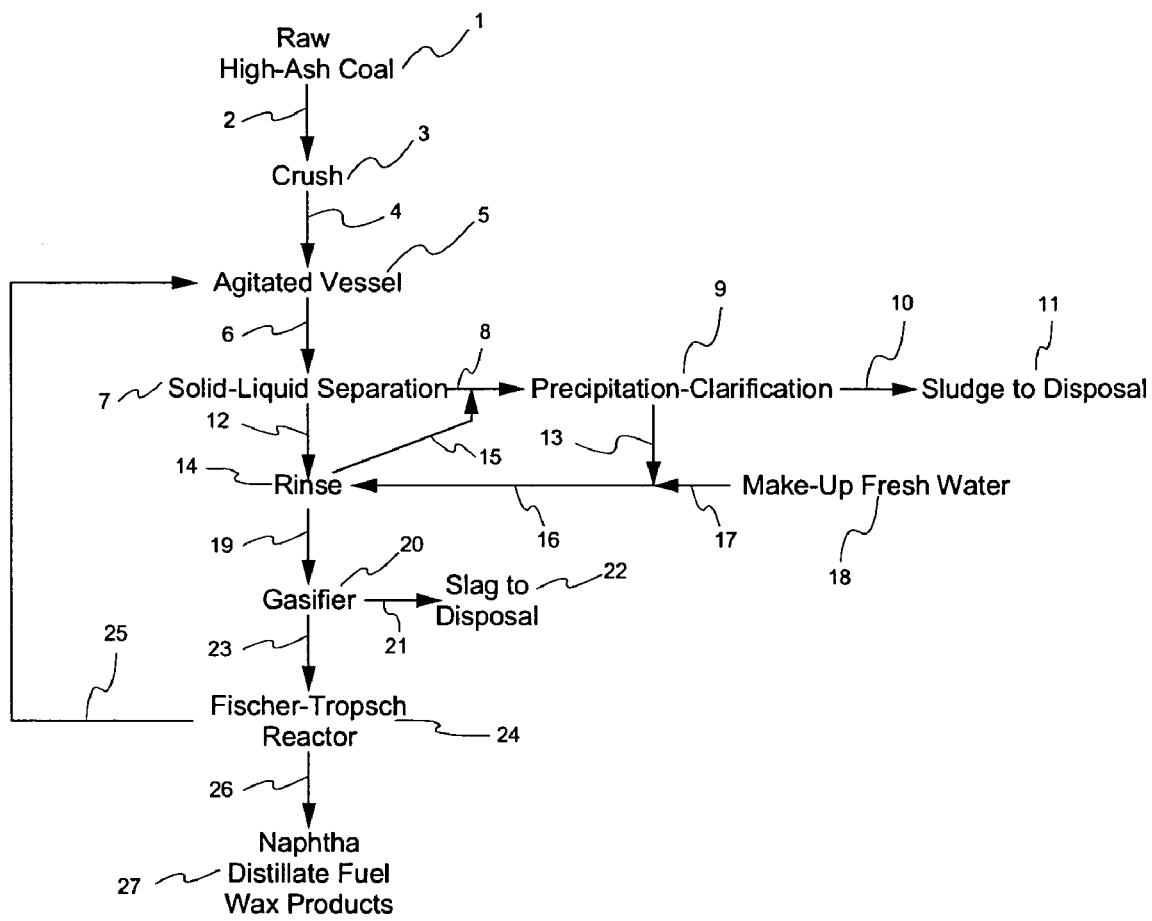
FIG. 1 is a schematic diagram of one embodiment of the present invention.

The methods of the present invention leach a significant portion of the ash constituents of coal or lignite with Fischer-Tropsch (FT) waste water. The process can be conducted continuously or in batches. The process is amenable to the use of any carbonaceous material commonly used as a feed to a gasification facility. This feed includes, but is not limited to, anthracite, low rank coals, bituminous coals, subbituminous coals, brown coal, cannel coal and lignite. For the purposes of this disclosure and the appended claims, the term "coal" is used to encompass each of these carbonaceous natural fuels.

All coals contains various concentrations of noncombustible materials called ash. The constituents that form ash include silicon, aluminum, iron, titanium, calcium, sodium, potassium, magnesium and minor concentrations of other elements. The depositional environment and method of mining and preparation determine which of these constituents of ash are present in the coal. The ash materials are deleterious to combustion and gasification because they dilute the valuable organic compounds that provide carbon and hydrogen. Ash is typically heated to melting temperatures in the combustion and gasification process to form a liquid slag that is ejected from the boiler or gasification vessel. A portion of the feedstock is consumed to provide the heat contained in the molten slag, resulting in an energy loss. Therefore, it is preferable to use low-ash feedstock to minimize the amount of fuel required to melt ash and form slag.

The composition of the ash predicts how the ash will behave during combustion or gasification. The melting temperature, slag viscosity, and tendency to adhere to refractory and tube surfaces in a boiler or gasification vessel are influenced by the relative concentrations of the elements that compose the ash. Some coals are unacceptable for combustion or gasification because they exhibit adverse behavior. These adverse ash properties have created enormous economic losses for coal producers and users. For example, coal and lignite from the northern Powder River Basin and North Dakota are otherwise valuable coal reserves that have greatly limited application due to unfavorably high levels of undesirable constituents in the ash, such as sodium.

Mining companies, utilities, and governmental agencies have worked to identify the ash constituents that lead to unacceptable behavior during combustion and gasification. Potential methods to reduce the total ash content and specific ash constituents have been identified. But many of the proposed processes have proven to be too costly or are incompatible with commercial gasification practices. As a result, enormous reserves of domestic coal and lignite remain underutilized.

Certain ash constituents are amenable to leaching by acids. Typically, the basic constituents of sodium, calcium, potassium and magnesium can be leached with acids and separated from the coal by traditional liquid-solid separation and rinsing methods improving the ash characteristics and making a suitable fuel for combustion or feedstock for gasification.

Many low-rank coals and lignite contain sufficient concentrations of sodium that may affect their utilization characteristics. Sodium reduces the melting temperature of the ash formed during combustion when the partially melted ash particles can stick to heat transfer surfaces and reduce the amount of heat available to generate steam. Ash deposits also restrict the passages that pass flue gas through the boiler, thus reducing efficiency. In gasification applications, sodium can adversely affect ash handling and conversion reactions.

In 1923, German scientists Fischer and Tropsch developed a method of producing synthetic hydrocarbons by passing steam over hot coke to form carbon monoxide and hydrogen, the water gas reaction:

$$2C + \tfrac{1}{2}O_2 + H_2O \text{ (steam)} \rightarrow 2CO + H_2 \qquad \text{Reaction (1)}$$

When an iron-based FT catalyst is used to convert water and carbon monoxide into hydrogen and carbon dioxide, the water gas shift reaction occurs:

$$H_2O + CO \rightarrow H_2 + CO_2 \qquad \text{Reaction (2)}$$

If the gas mixture is passed over a catalyst under high temperature and pressure, longer-chain hydrocarbons and water are produced:

$$2H_2 + CO \rightarrow H_2O + CH_2 \qquad \text{Reaction (3)}$$

Other oxygenated species are also produced in Reaction (3) including, primarily, acetic acid and ethanol. These and other acids and alcohols are dissolved in the water that is produced in the FT process. When iron-based catalysts are used, the weight of oxygenates dissolved in the water is between about 7% and about 10%. Of these oxygenates, about two-thirds is acetic acid, giving a concentration of between about 47 g and about 67 g of acetic acid per liter of the aqueous products. The amount of aqueous phase containing acetic acid produced in the FT reaction using an iron-based catalyst and lignite feed is about 8wt %. Conversely, when cobalt-based catalysts are used, a larger amount of water is produced because the water gas shift activity is generally very low. Additionally, the ratio of alcohols to acids in the aqueous waste products is generally higher when using cobalt-based catalysts.

The methods of the present invention utilize acidic aqueous FT waste to extract ash from high-ash coal to produce a coal product with improved value as a fuel. The raw, high-ash coal is preferably crushed to a specified topsize. The topsize may be selected to balance the cost of leaching with the cost to separate leach liquors from the solids. Small particles often leach faster than larger particles, but are more difficult to separate from the leach liquor. The desired particle size is selected after measuring leaching rates and liquid-solid separation characteristics. Preferably, the coal is crushed to a particle size between about 0.5 mm and about 15 mm in the longest dimension. More preferably, the coal is crushed to a particle size between about 1 mm and about 2 mm in the longest dimension.

The crushed coal is contacted with acidic FT waste water to leach ash from the coal. Preferably, the FT waste water is warmed to a temperature between about 20° C. and about 70° C., more preferably, the FT waste water is warmed to a temperature between about 40° C. and about 65° C., even more preferably, the FT waste water is warmed to a temperature between about 50° C. and about 60° C. While the FT waste water can be poured over the coal as a stream to remove ash, the best leaching of the ash from the coal is accomplished by mixing the coal in the FT waste water. A slurry is created with crushed coal and Aqueous FT waste. The slurry mixture is agitated in the vessel for a period of time that is sufficient to allow the desired reduction in ash to occur. The time is chosen as a function of mixing efficiency, temperature, particle size, ratio between the quantity of FT waste water and coal solids present in the agitated vessel, and the leaching rate of the coal. Economics and the desired coal quality are taken into consideration when specifying the retention time. To thoroughly mix the coal and the Aqueous FT waste, crushed coal is typically agitated in a suitable vessel with the FT waste water for a period of between about 1 minute and about 30 minutes. Preferably, the coal and the FT waste water are mixed together for a period of between about 3 minutes and about 15 minutes. More preferably, the coal and the FT waste water are mixed together for a period of about 10 minutes.

This mixing process is best accomplished by feeding the coal and the FT waste water into an agitated vessel at a controlled rate. The ratio of coal to FT waste water is chosen to ensure that adequate leaching occurs without excessive use of FT waste water. The specific characteristics of the coal feed are monitored to match the appropriate amount of FT waste water to achieve an acceptably high level of ash removal without excessive FT waste water use. Important factors to monitor in adjusting the coal to waste water ratio include the quantity of leachable ash minerals present in the coal and the strength of acid contained in the FT waste water. For example, when FT waste water containing 0.9 N acid (acetic acid) was mixed with a subbituminous coal containing 4.81% ash (dry basis), approximately 0.3-gram equivalents, or 0.4 liters of FT waste water per kilogram of coal were required to completely leach the calcium, magnesium, sodium, and potassium minerals. In commercial practice however, a reduction in ash between about 50% to about 80% is typically sufficient to achieve the economically desired increase in fuel value. Typically, the ratio of coal to FT waste water is between about 1:1 and about 1:50 on a wt/wt basis. More typically, the ratio of coal to FT waste water is between about 1:5 and about 1:20 on a wt/wt basis. Preferably, the ratio of coal to FT waste water is about 1:10 on a wt/wt basis. The actual consumption of FT waste water and the time and temperature of agitation are then adjusted accordingly.

Leached solids exit the vessel and are screened at a fine aperture size to separate the leachate from the solids. Various liquid-solid separation methods, such as filtering and settling, and separation devices, such as thickeners and clarifiers, may be used to recover the finely sized solids. The screened solids may be washed with fresh water to reduce the concentration of leached materials. The drained and rinsed solids are dried and stockpiled as fuel for a power plant or feedstock for a gasifier.

Leachate, containing the dissolved ash minerals, is processed by conventional water treatment processes to precipitate and concentrate the dissolved minerals for disposal. The clarified water, substantially free of dissolved materials, is recycled to the process to further minimize the overall water consumption.

In one embodiment of the present invention, a low rank coal is prepared as feedstock for a gasifier using the aqueous acidic waste water from a Fischer-Tropsch reactor which is, in turn, fed the syngas from the gasifier to complete a circuit with the water while utilizing a high-ash coal. Referring to FIG. 1, raw high-ash coal (1) obtained from is received (2) and crushed (3) to a particle size amenable for leaching. The crushed product (4) is feed at a controlled rate to an agitated vessel (5) where it is mixed with warm aqueous acidic waste material (25) produced by the Fischer-Tropsch reactor (24). The leached slurry (6) reports to liquid-solid separation (7) where the leachate (8) is partitioned from the leached solids (12). The drained leached solids (12) are rinsed (14) with clarified water (13) and makeup fresh water (17) is obtained from a source of fresh water (18) to further remove residual leachate.

The leachate (8) and rinse liquor (15) are combined and precipitated and clarified (9) to produce a mineral-rich sludge (10) for disposal (11). Clarified process water (13) produced by the precipitation and clarification step (9) is combined (16) with make-up fresh water (17) to rinse (14) the leached solids (12).

Drained and rinsed low-ash solids (19) are fed to the gasifier (20) producing slag (21) for disposal (22). Syngas (23) containing principally hydrogen and carbon monoxide feeds the Fischer-Tropsch reactor (24) producing salable products (26) naphtha, distillate fuel, and wax (27). Aqueous acidic waste (25) produced by the Fischer-Tropsch reactor (24) reports to the agitated vessel (5) completing the circuit.

In another embodiment of the present invention, the circuit described above is used with coals having acceptable levels of ash to minimize the use of fresh water. In this embodiment, the coal is crushed and mixed with warm FT waste water for use with slurry-fed gasifier applications. In these cases, the feed must be crushed to slurry size regardless of subsequent treatment, so the cost of crushing is not credited to the leaching application. Cost savings occur because waste water disposal costs are minimized, and the crushed coal does not have to be dewatered prior to making slurry as the ash content is already at acceptable level. Thus, the circuit established in this embodiment of the present invention represents a means of recycling waste water and decreasing fresh water consumption in the use of high quality, low-ash content coals in slurry-fed gasifier applications.

EXAMPLES

Example 1

This example demonstrates the percent reduction in ash using the methods of the present invention. In this example, a low rank coal was leached with acidic Fischer-Tropsch waste water. The total ash content (the non-combustible fraction of the coal) was reduced by 30%. The corresponding higher heating value was increased by almost 100 Btu/lb. Specific ash minerals were reduced by the values listed in Table 1.

TABLE 1

Changes in Specific Ash Constituents by Leaching with Aqueous FT Waste

| Ash Constituent | Reduction in Concentration, % of Initial Value |
| --- | --- |
| $Na_2O$ | 83 |
| $K_2O$ | 79 |
| MgO | 47 |
| CaO | 29 |

Example 2

This example demonstrates that sodium is substantially reduced for the tested coals under moderate process conditions using FT waste water as the leaching reagent. A series of trials was conducted with FT waste water to measure how much sodium could be leached from various low-rank coals and lignite.

TABLE 2

FT Waste Water Leaching Conditions and Results-14 mesh Solids, 9 Wt % Solids Mixture, Atmospheric Pressure

| | Percent Reduction in Untreated Coal Sodium Content | | | |
| --- | --- | --- | --- | --- |
| | 20° C. Leach Temperature | | 65° C. Leach Temperature | |
| Coal | 3-min Leach | 15-min Leach | 3-min Leach | 15-min Leach |
| Powder River Basin Subbituminous | 13 | 41 | 58 | 78 |
| Texas Lignite | 28 | 68 | 60 | 72 |
| North Dakota Lignite | 35 | 58 | 53 | 67 |
| Morwell | 35 | 66 | 67 | 82 |

TABLE 2-continued

FT Waste Water Leaching Conditions and Results-14 mesh Solids,
9 Wt % Solids Mixture, Atmospheric Pressure

| | Percent Reduction in Untreated Coal Sodium Content | | | |
|---|---|---|---|---|
| | 20° C. Leach Temperature | | 65° C. Leach Temperature | |
| Coal | 3-min Leach | 15-min Leach | 3-min Leach | 15-min Leach |
| Lignite | | | | |

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of leaching soluble ash from a coal comprising:
    a. contacting a coal with an aqueous Fischer-Tropsch waste; and,
    b. separating the coal from at least a portion of the aqueous Fischer-Tropsch waste, wherein ash present in the coal is dissolved in the aqueous fischer-Tropsch waste and removed from the coal in the aqueous Fischer-Tropsch waste.

2. The method of claim 1, wherein the coal is selected from the group consisting of lignite, bituminous coal and subbituminous coal.

3. The method of claim 1, wherein the coal has a particle size between about 0.5 mm and about 15 mm in the longest dimension.

4. The method of claim 1, wherein the coal has a particle size between about 1 mm and about 2 mm in the longest dimension.

5. The method of claim 1, wherein the contacting comprises agitating the coal and the aqueous Fischer-Tropsch waste in a vessel.

6. The method of claim 5, wherein the agitating is conducted for a period of time between about 1 minute and about 30 minutes.

7. The method of claim 5, wherein the agitating is conducted for a period of time between about 3 minutes and about 15 minutes.

8. The method of claim 5, wherein the agitating is conducted for a time of about 10 minutes.

9. The method of claim 5, wherein contents of the vessel are maintained at a temperature ranging from about 20° C. to about 70° C.

10. The method of claim 5, wherein contents of the vessel are maintained at a temperature ranging from about 40° C. to about 65° C.

11. The method of claim 5, wherein contents of the vessel are maintained at a temperature ranging from about 50° C. to about 60° C.

12. The method of claim 1, wherein the separating comprises filtering the coal from the aqueous Fischer-Tropsch waste.

13. The method of claim 1, wherein the separating comprises settling the coal in the aqueous Fischer-Tropsch waste.

14. The method of claim 1, wherein the ratio of the weight of the coal to the weight of the aqueous Fischer-Tropsch waste is between about 1:1 and about 1:50.

15. The method of claim 1, wherein the ratio of the weight of the coal to the weight of the aqueous Fischer-Tropsch waste is between about 1:5 and about 1:20.

16. The method of claim 1, wherein the ratio of the weight of the coal to the weight of the aqueous Fischer-Tropsch waste is about 1:10.

17. A method of leaching soluble ash from a coal comprising:
    a. crushing a raw coal to form a crushed coal having a particle size between about 0.5 mm and about 15 mm in the longest dimension;
    b. agitating the crushed coal in the presence of an aqueous Fischer-Tropsch waste to promote contact of the aqueous Fischer-Tropsch waste with the crushed coal and to leach ash present in the coal into the aqueous Fischer-Tropsch waste; and,
    c. separating the crushed coal from the aqueous Fischer-Tropsch waste to isolate a coal having a sodium content lower than the sodium content of the raw coal.

18. The method of claim 17, comprising the additional step of suspending the coal having a lower sodium content than the sodium content of the raw coal in an aqueous solution to prepare a slurry feed for gasification.

19. The method of claim 18, wherein the aqueous solution is an aqueous Fischer-Tropsch waste.

20. A method of leaching soluble ash from a coal comprising:
    a. contacting a coal with a liquid consisting of an aqueous Fischer-Tropsch waste; and,
    b. separating the coal from at least a portion of the liquid, wherein ash present in the coal is dissolved in the liquid and removed from the coal in the liquid.

21. A method of leaching soluble ash from a coal comprising:
    c. contacting a coal with a liquid consisting essentially of an aqueous Fischer-Tropsch waste; and,
    d. separating the coal from at least a portion of the liquid, wherein ash present in the coal is dissolved in the liquid, and removed from the coal in the liquid.

* * * * *